US008866824B2

(12) United States Patent
Ishikawa et al.

(10) Patent No.: US 8,866,824 B2
(45) Date of Patent: Oct. 21, 2014

(54) IMAGE PROCESSING METHOD, IMAGE PROCESSING DEVICE, AND DISPLAY APPARATUS

(75) Inventors: Takanori Ishikawa, Saitama (JP); Kentaro Doba, Tokyo (JP); Yota Komoriya, Tokyo (JP); Tsutomu Nigami, Tokyo (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 13/349,727

(22) Filed: Jan. 13, 2012

(65) Prior Publication Data

US 2012/0200577 A1   Aug. 9, 2012

(30) Foreign Application Priority Data

Feb. 3, 2011   (JP) ................. 2011-022065

(51) Int. Cl.
*G06F 15/00*  (2006.01)
*G06T 7/00*   (2006.01)

(52) U.S. Cl.
CPC ..... *G06T 7/0022* (2013.01); *G06T 2207/10012* (2013.01)
USPC ........................................ 345/501

(58) Field of Classification Search
None
See application file for complete search history.

(56) References Cited

U.S. PATENT DOCUMENTS 6,215,899 B1 *  4/2001  Morimura et al. ............ 382/154

FOREIGN PATENT DOCUMENTS

JP   07-282259   10/1995

OTHER PUBLICATIONS

Pascal Fua, A parallel stereo algorithm that produces dense depth maps and preserves image features, 1993, Machine Vision and Applications 6:35-49.*

* cited by examiner

*Primary Examiner* — Kee M Tung
*Assistant Examiner* — Xin Sheng
(74) *Attorney, Agent, or Firm* — Sheridan Ross P.C.

(57) ABSTRACT

An image processing method includes: calculating a first index value through back matching between a first image and a second image in relation to a first pixel which is one or a plurality of pixels of the first image and a second pixel which is one or a plurality of pixels located at a position corresponding to the first pixel in the second image; calculating a second index value by normalizing a correlation index value indicating correlation between the first pixel and the second pixel using a complexity index value indicating complexity of an image which is displayed by the first pixel; and calculating a third index value by multiplying the first index value by the second index value.

9 Claims, 5 Drawing Sheets

IMAGE PROCESSING METHOD, IMAGE PROCESSING DEVICE, AND DISPLAY APPARATUS

FIELD

The present disclosure relates to an image processing method, an image processing device, and a display apparatus, and more particularly to an image processing method, an image processing device, and a display apparatus, which detect a parallax of stereoscopic images.

BACKGROUND

In a case of obtaining a parallax from two-viewpoint images corresponding to, for example, a left eye image and a right eye image, in order to generate stereoscopic images, a matching process is performed between one image which is a criterion image and the other image which is a reference image. Specifically, pixels (corresponding pixels) on the reference image having high correlation with pixels (criterion pixels) on the criterion image are detected, and differences in positions between the criterion pixels and the corresponding pixels are detected as a parallax between the criterion image of an image displayed by the criterion pixels and the reference image.

In this case, if there is a state (occlusion) where an object which is displayed in the criterion image is blocked by a foreground-object and is not displayed in the reference image, a region (occlusion region) occurs at which corresponding pixels with respect to criterion pixels are not correctly detected. Therefore, there has been developed a technique in which the occlusion region is detected using back matching where a matching process is performed by exchanging a criterion image and a reference image, and a parallax for the detected occlusion region is estimated based on a parallax which is correctly detected in a peripheral region (for example, refer to JP-A-7-282259).

SUMMARY

However, in the technique disclosed in JP-A-7-282259, there are cases where a determination of the occlusion region and a parallax estimation accuracy based thereon are not sufficient. For this reason, a technique for determining an occlusion region with higher accuracy and resultantly estimating a parallax with higher accuracy is necessary.

Thus, it is desirable to provide a novel and improved image processing method, an image processing device, and a display apparatus which can estimate a parallax of stereoscopic images with higher accuracy.

According to one embodiment of the present disclosure, there is provided an image processing method including calculating a first index value through back matching between a first image and a second image in relation to a first pixel which is one or a plurality of pixels of the first image and a second pixel which is one or a plurality of pixels located at a position corresponding to the first pixel in the second image; calculating a second index value by normalizing a correlation index value indicating correlation between the first pixel and the second pixel using a complexity index value indicating complexity of an image which is displayed by the first pixel; and calculating a third index value by multiplying the first index value by the second index value.

The first image and the second image may be stereoscopic images corresponding to different viewpoints, and the third index value may be an index value which indicates reliability of a parallax at a position corresponding to the first pixel among parallaxes detected through a matching process between the first image and the second image.

The image processing method may further include determining whether or not the parallax at the position corresponding to the first pixel is reliable based on the third index value; and replacing the parallax at the position corresponding to the first pixel which is determined as being unreliable, with a parallax which is estimated based on a parallax at another position which is determined as being reliable among the detected parallaxes.

The first index value may be calculated by adding index values to each other which are respectively calculated through back matching in a horizontal direction and in a vertical direction between the first image and the second image.

According to another embodiment of the present disclosure, there is provided an image processing device including an index value calculation unit that calculates a first index value through back matching between a first image and a second image in relation to a first pixel which is one or a plurality of pixels of the first image and a second pixel which is one or a plurality of pixels located at a position corresponding to the first pixel in the second image; calculates a second index value by normalizing a correlation index value indicating correlation between the first pixel and the second pixel using a complexity index value indicating complexity of an image which is displayed by the first pixel; and calculates a third index value by multiplying the first index value by the second index value.

According to still another embodiment of the present disclosure, there is provided a display apparatus including a display unit; and an index value calculation unit, wherein the index value calculation unit calculates a first index value through back matching between a first image and a second image in relation to a first pixel which is one or a plurality of pixels of the first image and a second pixel which is one or a plurality of pixels located at a position corresponding to the first pixel in the second image; calculates a second index value by normalizing a correlation index value indicating correlation between the first pixel and the second pixel using a complexity index value indicating complexity of an image which is displayed by the first pixel; and calculates a third index value by multiplying the first index value with the second index value.

As described above, according to the embodiments of the present disclosure, it is possible to estimate a parallax of stereoscopic images with higher accuracy.

DETAILED DESCRIPTION

Figure 1:
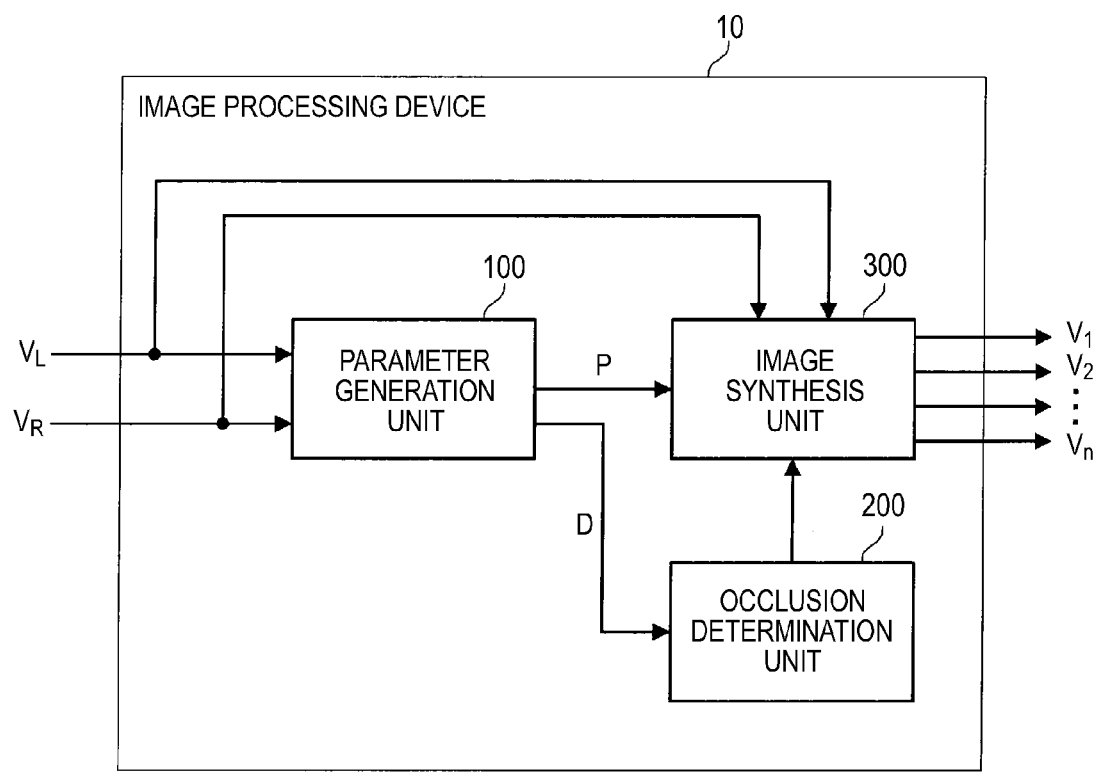
FIG. 1 is a block diagram illustrating a functional configuration of an image processing device according to an embodiment of the present disclosure.

Hereinafter, embodiments of the present disclosure will be described with reference to the accompanying drawings. In addition, in the present specification and drawings, constituent elements which have substantially the same functional configuration are given the same reference numerals, and thus repeated description will be omitted.

The description will be made in the following order.
1. DESCRIPTION OF RELATED TECHNIQUE
2. CONFIGURATION OF IMAGE PROCESSING DEVICE
3. CONFIGURATION OF PARAMETER GENERATION UNIT
4. PROCESS PERFORMED BY IMAGE PROCESSING DEVICE
5. SUPPLEMENT <1. Description of Related Technique>

First, related techniques necessary to understand the embodiments of the present disclosure will be described.

(1-1. Detection of Disparity Through Matching Process)

When a parallax (disparity) is detected from two-viewpoint images corresponding to a left eye image and a right eye image, a matching process is performed. In the matching process, a first image of the two-viewpoint images is a criterion image, and a second image thereof is a reference image. In the matching process, one or a plurality of pixels which are respectively included in the criterion image and the reference image are processing units. Specifically, a pixel having the highest correlation of pixels included in the reference image with respect to an arbitrary criterion pixel included in the criterion image is specified as a corresponding pixel, and a motion vector from the criterion pixel to the corresponding pixel, that is, a difference between positions of the criterion pixel and the corresponding pixel is detected as a disparity for an image displayed by the criterion pixel.

(1-2. Detection Error of Disparity in Occlusion Region)

There are cases where a region which is displayed in the first image is not displayed in the second image due to blocking by a foreground-object or the like in the two-viewpoint images. This state is called occlusion. This corresponds to a case where, for example, a first object is displayed to the rear of a second object in the first image, whereas the first object is hidden behind the second object due to a variation in the viewpoint and thus is not displayed in the second image. Here, when the occlusion occurs, the region which is displayed only in the first image is referred to as an occlusion region. In detecting a disparity through the matching process, a pixel corresponding to a criterion pixel included in the occlusion region does not exist in the reference image. In this case, a pixel of the reference image having the highest correlation with the criterion pixel may be, for example, a pixel which is located at a position apart from the criterion pixel. Therefore, there are cases where a correct disparity is not detected in relation to the criterion pixel included in the occlusion region in the matching process.

(1-3. Back Matching)

The back matching is a method for determining a detection error of a disparity through the matching process for, for example, in the above-described occlusion region. In the back matching, a second matching process is performed in which a criterion image and a reference image in a first matching process for detecting a disparity are interchanged. That is to say, in the second matching process, the second image is a criterion image, and the first image is a reference image. In a case where a result of the second matching process matches a result of the first matching process for a certain pixel, reliability of a disparity detected through the matching process for the pixel is considered as being high. Specifically, in a case where a corresponding pixel which is specified using a pixel $x_1$ as a criterion pixel is a pixel $x_2$ in the first matching process, if, in the second matching process, a corresponding pixel which is specified using the pixel $x_2$ as a criterion image is the pixel $x_1$ or a pixel around the pixel $x_1$, the reliability of a disparity detected through the matching process for the pixel $x_1$ is estimated to be high.

(1-4. Problem of Back Matching)

It is possible to determine a detection error of a disparity through the matching process in the occlusion region using the back matching with some accuracy. However, in a region other than the occlusion region as well, a result of the first matching process does not necessarily match a result of the second matching process in the back matching. For example, in a case or the like where pixels adjacent to each other have the same pixel value in a part where an image is planarized, there are cases where a slight mismatch occurs between a result of the first matching process and a result of the second matching process. Therefore, a difference value between a result of the first matching process and a result of the second matching process for each pixel may have a distribution with a great variance. In this case, it is necessary to set a threshold value in the difference value in order to specify the occlusion region which is a region where errors are detected in the disparity. However, it is not easy to set an appropriate threshold value since there is no quantitative index for the setting of a threshold value. As a result, there are cases where determination accuracy of disparity error detection through the back matching is not sufficient.

An embodiment of the present disclosure for handling the problems of the related techniques will now be described.

<2. Configuration of Image Processing Device>

First, a schematic configuration of an image processing device according to an embodiment of the present disclosure will be described with reference to FIG. 1. FIG. 1 is a block diagram illustrating a functional configuration of an image processing device 10 according to an embodiment of the present disclosure.

The image processing device 10 generates output images $V_1, V_2, \ldots$, and $V_n$ from input images $V_L$ and $V_R$. The input images $V_L$ and $V_R$ are viewpoint images corresponding to a left eye image and a right eye image, respectively, and are examples a first image and a second image corresponding to different viewpoints. On the other hand, the output images $V_1$, $V_2, \ldots$, and $V_n$ are multiple-viewpoint images for displaying a stereoscopic image. The output images $V_1, V_2, \ldots$, and $V_n$ may be multiple-viewpoint images such as, for example, four-viewpoint, six-viewpoint, or eight-viewpoint images. The image processing device 10 detects a disparity through the matching process using the input images $V_L$ and $V_R$ and generates the output images $V_1, V_2, \ldots$, and $V_n$ by synthesizing the input images $V_L$ and $V_R$ based on the detected disparity.

Here, as described above, the matching process is executed with the units of one or a plurality of pixels included in each image. The image processing device 10 uses a block matching method as the matching process. In the block matching process, an image is divided into pixel blocks with a predetermined size, and a pixel block having the highest correlation of pixel blocks included in the reference image is specified as a corresponding pixel block with respect to an arbitrary criterion pixel block included in the criterion image. A vector from the criterion pixel block to the corresponding pixel block (for example, a vector connecting upper left positions of the respective blocks) is detected as a disparity P in the criterion pixel block.

In addition, in the image processing device 10, a sum of absolute differences (SAD) in luminance values of each pixel is used as a correlation index value indicating correlation between pixel blocks. The correlation index value may use, for example, a sum of squared differences (SSD), zero-mean normalized cross-correlation (ZNCC), or the like, in addition to the SAD. In the matching process, in addition to the block matching process, for example, a method such as a DP matching method or phase only correlation may be used. In the methods as well, a correlation index value is set for one or a plurality of pixels which are process units.

The image processing device 10 may be, for example, an image editing device, an imaging device, or a device such as a PC (Personal Computer), having at least the above-described function. The image processing device 10 at least includes a parameter generation unit 100, an occlusion determination unit 200, and an image synthesis unit 300 in order to realize the function. Each of the units may be implemented using, for example, a DSP (Digital Signal Processor). The image processing device 10 may include an interface such as an HDMI (High Definition Multimedia Interface) for inputting input images $V_L$ and $V_R$ and output images $V_1, V_2, \ldots,$ and $V_n$, and a storage device such as a RAM (Random Access Memory) which stores images and numerical values used for a process. In addition, the image processing device 10 may include an imaging unit for capturing the input images $V_L$ and $V_R$ and a display unit for displaying the output images $V_1, V_2, \ldots,$ and $V_n$.

The parameter generation unit 100 performs a matching process, back matching, and a process for calculating an activity of an image using the input images $V_L$ and $V_R$, thereby generating various parameters. The parameters generated by the parameter generation unit 100 include a disparity P of the input images $V_L$ and $V_R$, detected in the block matching process, and an index value D indicating reliability of the disparity P. The disparity P is provided to the image synthesis unit 300, and the index value D is supplied to the occlusion determination unit 200. In addition, the index value D is generated by multiplying an index value $D_1$ indicating reliability of detection of a disparity obtained through the back matching, by an index value $D_2$ obtained by normalizing the correlation index value between the input images $V_L$ and $V_R$ with an activity of an image. A detailed configuration of the parameter generation unit 100 will be described later.

The occlusion determination unit 200 determines an occlusion region in the input images $V_L$ and $V_R$ based on the index value D, provided from the parameter generation unit 100, indicating the reliability of the disparity P. Since it is considered that, in the occlusion region, a disparity is not correctly detected, that is, erroneously detected, the occlusion region can be specified as a pixel block of which disparity detection reliability indicated by the index value D is less than a predetermined threshold value. Information for the specified occlusion region is provided to the image synthesis unit 300. As described later, the index value D input from the parameter generation unit 100 is a value having bipolarized distribution. Thus, an appropriate threshold value can be easily set as compared with the disparity detection error determination based on a disparity result which has been introduced as the related technique. Therefore, the occlusion determination unit 200 can determine an occlusion region with high accuracy.

The image synthesis unit 300 generates the output images $V_1, V_2, \ldots,$ and $V_n$ by synthesizing the input images $V_L$ and $V_R$ based on the disparity P provided from the parameter generation unit 100 and the information for the occlusion region input from the occlusion determination unit 200. As described above, there is a high possibility that the disparity P provided from the parameter generation unit 100 will be erroneously detected in the occlusion region. Therefore, the image synthesis unit 300 uses a value of a disparity which is estimated from a disparity P for a region where the disparity P is correctly detected, in the vicinity of the occlusion region, instead of the disparity P detected through the matching process in the occlusion region.

Accordingly, occlusion region determination accuracy by the occlusion determination unit 200 has an effect on quality of the output images $V_1, V_2, \ldots,$ and $V_n$ which are generated by the image synthesis unit 300. If occlusion region determination accuracy is low, for example, a disparity P which is erroneously detected in the occlusion region may be used as it is, or a disparity which is estimated from a disparity of a peripheral region may be used without using a disparity P which is correctly detected. As a result, the output images $V_1, V_2, \ldots,$ and $V_n$ may be unnatural stereoscopic images. On the other hand, if the occlusion region determination accuracy is high, the output images $V_1, V_2, \ldots,$ and $V_n$ may be more natural stereoscopic images.

<3. Configuration of Parameter Generation Unit>

Figure 2:
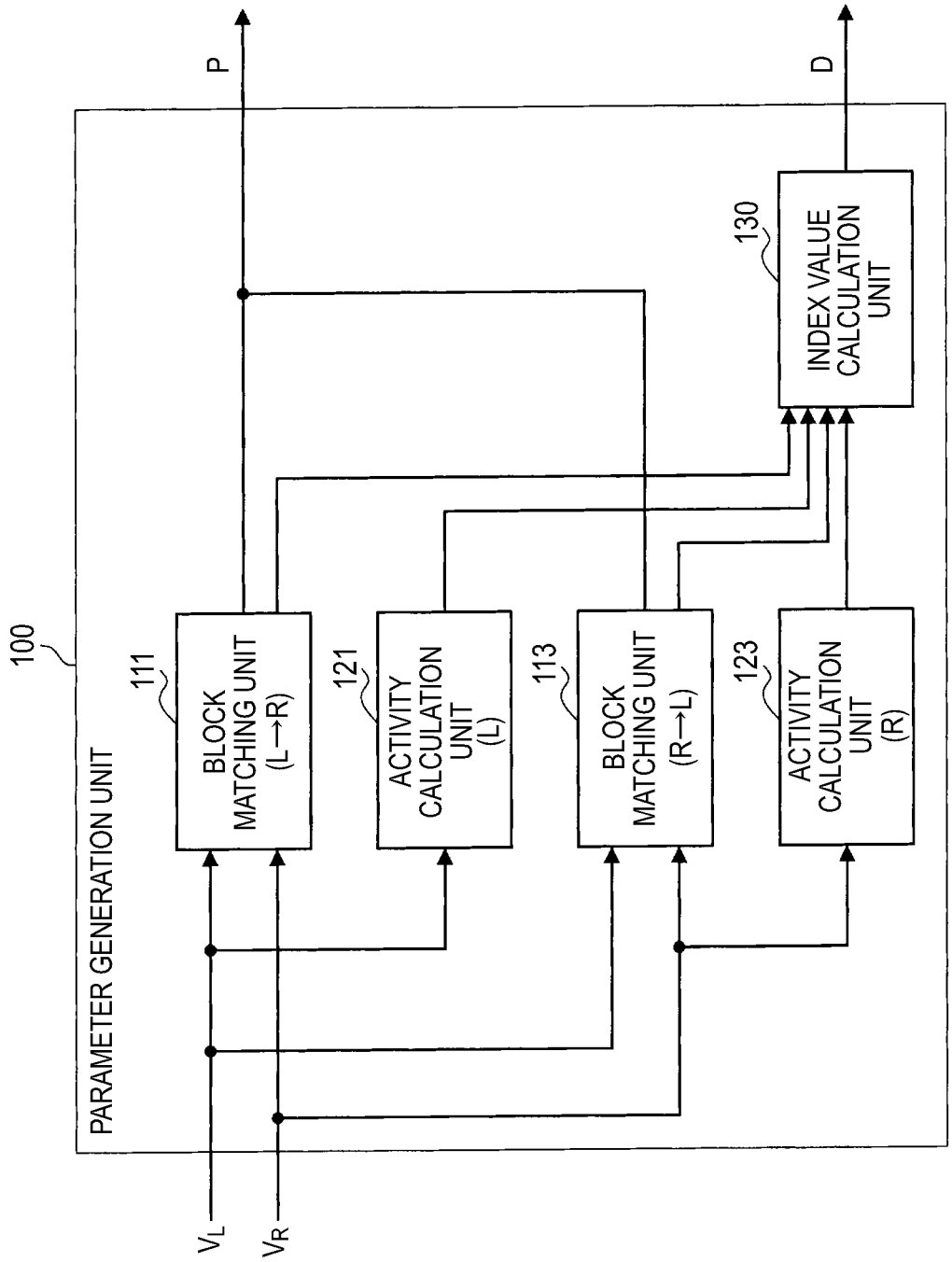
FIG. 2 is a block diagram illustrating a functional configuration of a parameter generation unit of the image processing device according to the embodiment of the present disclosure.

Next, with reference to 2, a configuration of the parameter generation unit of the image processing device according to the embodiment of the present disclosure will be described. FIG. 2 is a block diagram illustrating a functional configuration of the parameter generation unit 100 of the image processing device 10 according to the embodiment of the present disclosure.

As described above, the parameter generation unit 100 performs the matching process, the back matching, and the process for calculating an activity of an image using the input images $V_L$ and $V_R$, thereby generating various parameters. The parameters generated by the parameter generation unit 100 include a disparity P of the input images $V_L$ and $V_R$, detected in the block matching process, and an index value D indicating reliability of the disparity detection of the input images $V_L$ and $V_R$. The parameter generation unit 100 includes block matching units 111 and 113, activity calculation units 121 and 123, and index value calculation unit 130 in order to realize the above functions.

The block matching units 111 and 113 perform the matching process using the input images $V_L$ and $V_R$. As described above, in the image processing device 10, the block matching process is used as the matching process. The block matching unit 111 performs the matching process using the input image $V_L$ as a criterion image, and the input image $V_R$ as a reference image. On the other hand, the block matching unit 113 performs the matching process using the input image $V_R$ as a criterion image, and the input image $V_L$ as a reference image. In a case where a disparity P is detected using the input image $V_L$ as a criterion, a result of the matching process by the block matching unit 111 is provided to the image synthesis unit 300 as the disparity P. In addition, in a case where a disparity P is detected using the input image $V_R$ as a criterion, a result of the matching process by the block matching unit 113 is provided to the image synthesis unit 300 as the disparity P.

Here, the matching processes in the respective block matching units 111 and 113 are two matching processes where the criterion image and the reference image are interchanged with each other. Therefore, it is possible to perform the back matching for determining a disparity detection error through the matching process by mutually referring to results of the matching processes in the block matching units 111 and 113. For example, it is assumed that a pixel block $B_1$ of the input image $V_L$ is specified as a criterion pixel block, and a corresponding pixel of the input image $V_R$ is a pixel block $B_2$, in the matching process of the block matching unit 111. In this case, if, in the matching process of the block matching unit 113, the pixel block $B_2$ of the input image $V_R$ is specified as a criterion pixel block, and a corresponding pixel block of the input image $V_L$ is the pixel block $B_1$ or a pixel block around the pixel block $B_1$, reliability of a disparity detected through the matching process of the block matching unit 111 is estimated to be high.

The activity calculation units 121 and 123 respectively calculate activities $A_L$ and $A_R$ of images in relation to the input image $V_L$ and $V_R$. The activity calculation unit 121 calculates an activity of the input image $V_L$. In addition, the activity calculation unit 123 calculates an activity of the input image $V_R$. The activity A of an image is a complexity index value indicating complexity of an image, and may be calculated for each pixel or pixel block. For example, the activity A of pixel units may be a mean value of an absolute difference between luminance values of a target pixel and each pixel positioned around the target pixel (for example, eight adjacent pixels). In addition, for example, an activity A of the pixel block unit may be a sum total of activities A of the pixel unit for pixels included in the pixel block. Further, for the calculation of the activity A, the absolute difference of luminance values as well as, for example, variance of luminance values, a dynamic range, or the like may be used.

The index value calculation unit 130 calculates an index value D indicating reliability of the disparity P of the input image $V_L$ and $V_R$, detected in the block matching unit 111 or the block matching unit 113, based on values calculated by the block matching units 111 and 113 and the activity calculation units 121 and 123. A process of the index value calculation unit 130 will be described later in detail.

<4. Process Performed by Image Processing Device>

Next, an example of the process by the image processing device according to the embodiment of the present disclosure will be described with reference to FIGS. 3 to 5.

Figure 3:
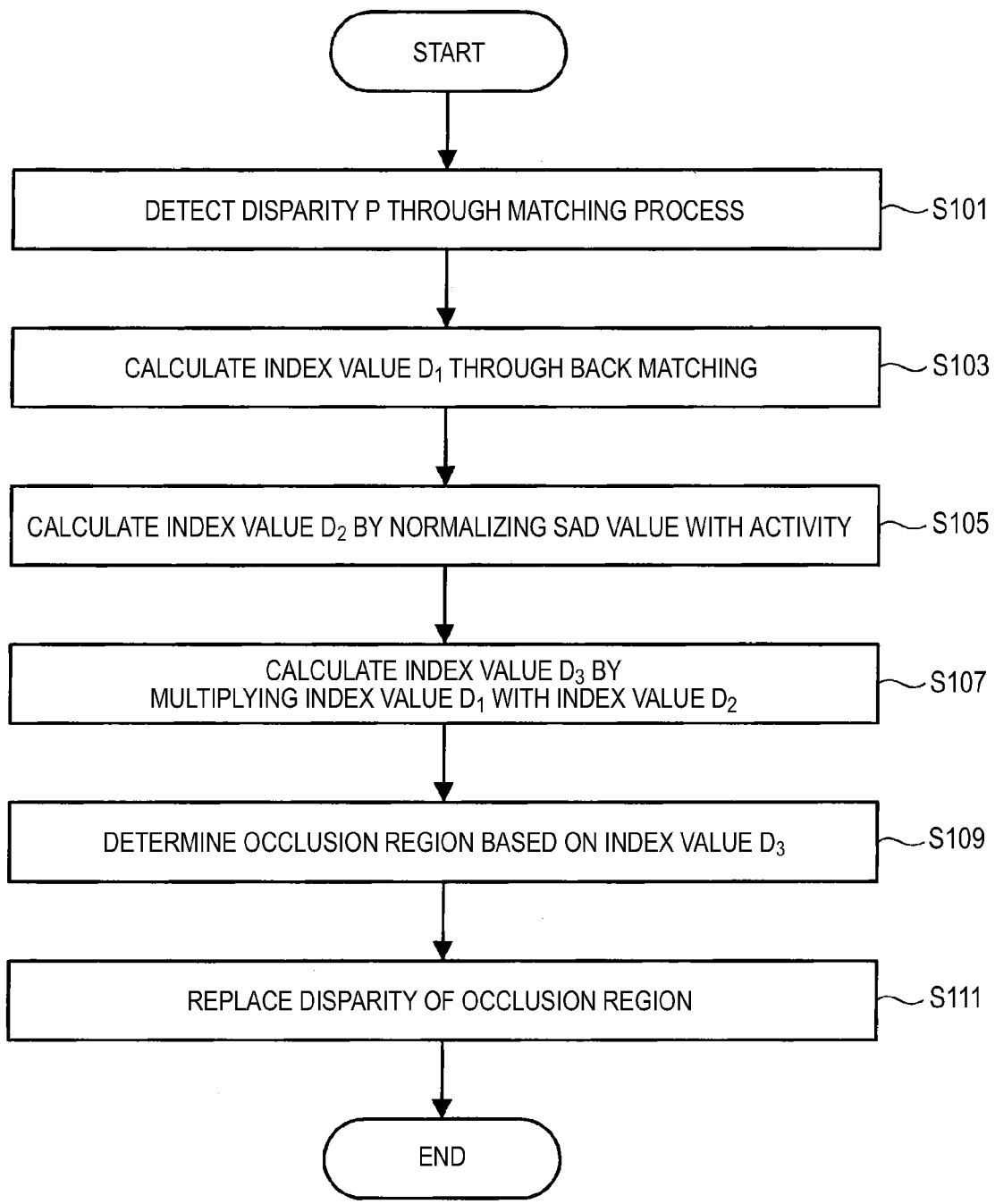
FIG. 3 is a flowchart illustrating a process example performed by the image processing device according to the embodiment of the present disclosure.

FIG. 3 is a flowchart illustrating an example of the process performed by the image processing device 10 according to the embodiment of the present disclosure. Here, the image processing device 10 detects a disparity P using the input image $V_L$ as a criterion, determines an occlusion region based on the index value D, and supplements a disparity of the occlusion region using a disparity P of a peripheral region.

First, the block matching unit 111 of the parameter generation unit 100 detects a disparity P using the input image $V_L$ as a criterion through the matching process (step S101). Next, the index value calculation unit 130 refers to a result of the matching process by the block matching unit 113 along with a result of the matching process by the block matching unit 111, and calculates a first index value $D_1(x,y)$ through the back matching in relation to a pixel block at a position (x,y) of the input image $V_L$ (step S103).

Here, in step S103, in relation to a first pixel which is one or a plurality of pixels located at the position (x,y) of the first image (input image $V_L$) and a second pixel which is one or a plurality of pixels located at the position (x,y) of the second image (input image $V_R$), the first index value $D_1(x,y)$ is calculated through the back matching between the first image and the second image.

Next, the index value calculation unit 130 calculates a second index value $D_2(x,y)$ by normalizing an SAD value between the input image $V_L$ and $V_R$ calculated by the block matching unit 111 with the activity $A_L(x,y)$ of the input image $V_L$, calculated by the activity calculation unit 121, in relation to the pixel block located at the position (x,y) of the input image $V_L$ (step S105).

Here, in step S105, the correlation index value (the SAD value between the input image $V_L$ and $V_R$) between the first pixel and the second pixel is normalized using the image complexity index value (activity $A_L(x,y)$) indicated by the first pixel, thereby calculating the second index value $D_2(x,y)$.

Next, the index value calculation unit 130 multiplyes the first index value $D_1(x,y)$ by the second index value $D_2(x,y)$, thereby calculating a third index value $D_3(x,y)$ (step S107). The index value calculation unit 130 provides the third index value $D_3(x,y)$ to the occlusion determination unit 200 as an index value D indicating reliability of the disparity P.

Next, the occlusion determination unit 200 determines an occlusion region in the input image $V_L$ based on the index value D provided from the index value calculation unit 130, that is, the third index value $D_3(x,y)$ (step S109). The occlusion determination unit 200 provides information of the determined occlusion region to the image synthesis unit 300.

Here, in step S109, it is determined whether or not a parallax (disparity) at the position (x,y) detected through the matching process is reliable based on the third index value $D_3(x,y)$. The case where the detected parallax is reliable may be a case where the position (x,y) is not included in the occlusion region, and the case where the detected parallax is not reliable may be a case where the position (x,y) is included in the occlusion region.

Thereafter, the image synthesis unit 300 replaces the disparity of the occlusion region determined by the occlusion determination unit 200 with a disparity estimated from a disparity of the peripheral region (step S111). Here, the occlusion region is a region where reliability of the disparity P detected through the matching process by the block matching unit 111 is low, that is, it is estimated that the disparity is erroneously detected. On the other hand, the peripheral region is a region where reliability of the disparity P is high, that is, it is estimated that the disparity is correctly detected.

Here, in step S111, a parallax (a disparity) at the position (x,y) which is determined as being unreliable is replaced with a parallax which is estimated based on a parallax at another position determined as being reliable. The unreliable parallax may be a disparity detected in the occlusion region, and the reliable parallax may be a disparity which is correctly detected in the peripheral region of the occlusion region.

Next, the processes in steps S103, S105 and S107 will be described in more detail with reference to FIGS. 4 and 5.

Figure 4:
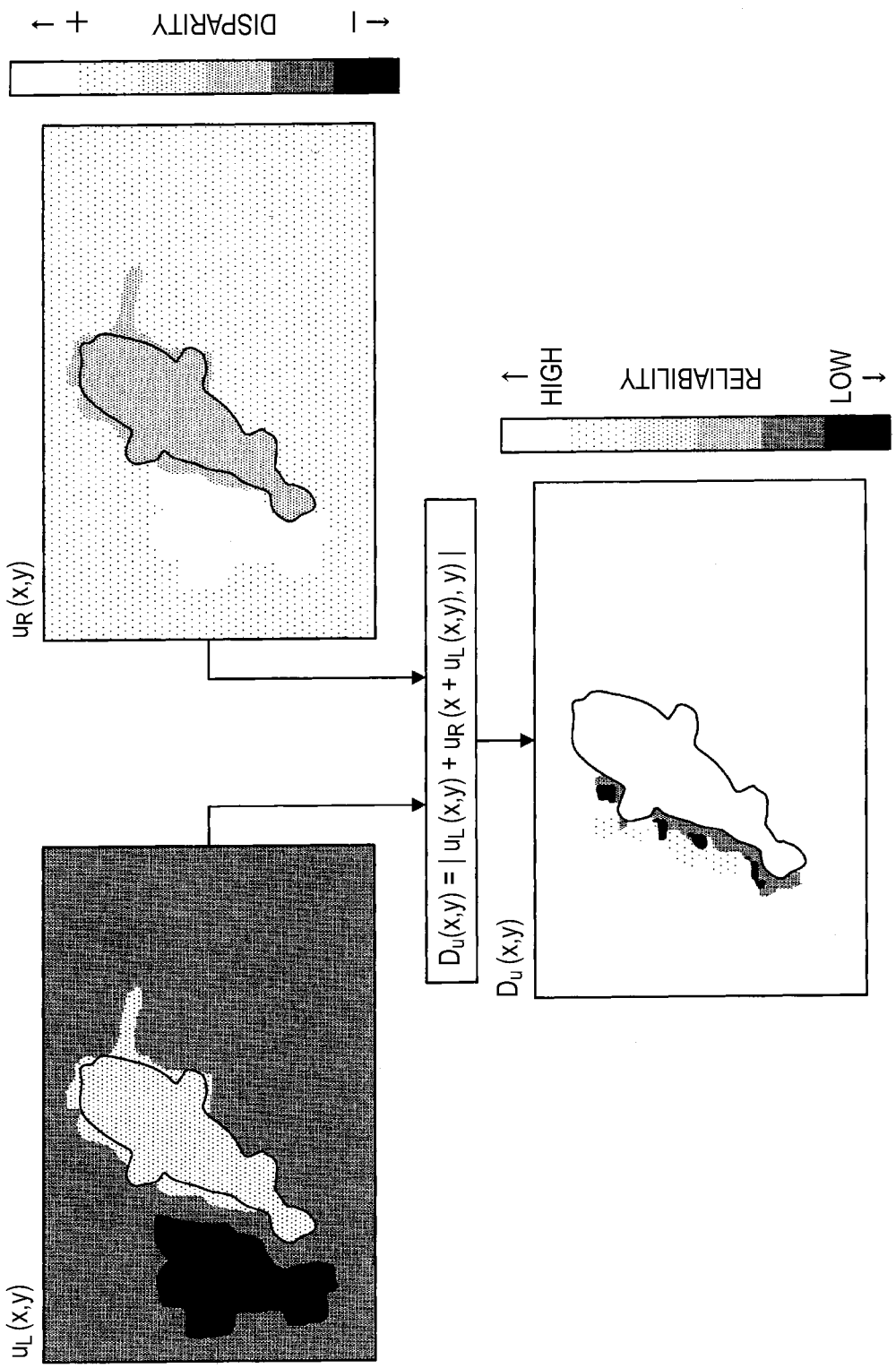
FIG. 4 is a diagram illustrating an example of the back matching in the horizontal direction according to an embodiment of the present disclosure.

FIG. 4 is a diagram illustrating an example of the horizontal direction back matching according to an embodiment of the present disclosure. In the example shown in FIG. 4, a horizontal direction back matching difference value $D_u(x,y)$ is calculated from a disparity $u_L(x,y)$ detected for each coordinate (x,y) of each pixel block through the first matching process in the horizontal direction using the input image $V_L$ as a criterion image, and a disparity $u_R(x,y)$ detected in the same manner through the second matching process in the horizontal direction using the input image $V_R$ as a criterion image.

Here, the disparity $u_L(x,y)$ and the disparity $u_R(x,y)$ are all vector quantities which are extracted between pixel blocks in the matching process. Since the matching process is performed in the horizontal direction, a direction of the disparity vector is one of the left direction and the right direction. Therefore, as shown in the figure, the disparity may be expressed by + and − on the single axis. In addition, since the input images $V_L$ and $V_R$ are images respectively corresponding to a left eye image and a right eye image, the disparity is mainly generated in the horizontal direction. Thus, the matching process is performed in the horizontal direction as shown in the figure. As described later, a matching process in the vertical direction may be further performed.

In the above-described example, the horizontal direction back matching difference value $D_u(x,y)$ is calculated using the following Equation (1).

$$D_u(x,y)=|u_L(x,y)+u_R(x+u_L(x,y),y)| \qquad (1)$$

Here, the disparity $u_R(x+u_L(x,y),y)$ is a disparity detected through the second matching process in relation to a pixel block at a position where the disparity $u_L(x,y)$ detected through the first matching process is added to the x coordinate of the criterion pixel block in the first matching process, that is, a corresponding pixel block in the first matching process. That is to say, the horizontal direction back matching difference value $D_u(x,y)$ is an absolute value of a sum of an "outgoing vector" in the first matching process and a "returning vector" in the second matching process. Since the "outgoing vector" and the "returning vector" are vectors opposite to each other with respect to the horizontal direction, as the vectors become close to the same magnitude, a value of the horizontal direction back matching difference value $D_u(x,y)$ which is an absolute value of the sum becomes close to 0.

Figure 5:
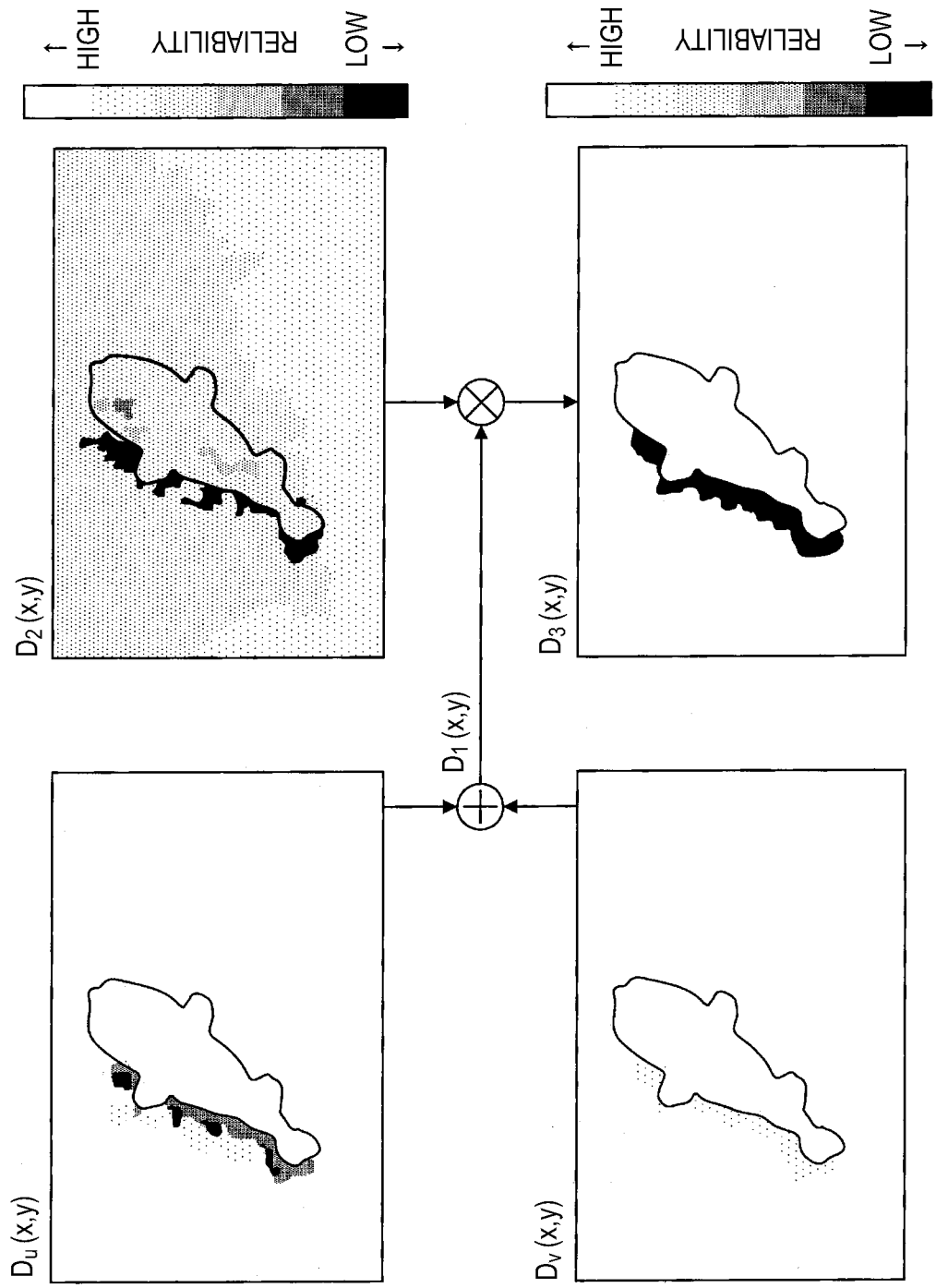
FIG. 5 is a diagram illustrating an example of the index value calculation according to an embodiment of the present disclosure.

FIG. 5 is a diagram illustrating an example of the index value calculation according to the embodiment of the present disclosure. FIG. 5 shows an example in which the first index value $D_1(x,y)$ is generated through the addition of the horizontal direction back matching difference value $D_u(x,y)$ and the vertical direction back matching difference value $D_v(x,y)$, and the third index value $D_3(x,y)$ is generated through multiplying of the first index value $D_1(x,y)$ by the second index value $D_2(x,y)$.

The horizontal direction back matching difference value $D_u(x,y)$ is an absolute difference value between the disparity $u_L(x,y)$ detected through the horizontal direction matching process using the input image $V_L$ as a criterion image and the disparity $u_R(x,y)$ detected through the horizontal direction matching process using the input image $V_R$ as a criterion image, as described with reference to FIG. 4.

The vertical direction back matching difference value $D_v(x,y)$ may be obtained in the same manner as in the horizontal direction. That is to say, a vertical direction back matching difference value $D_v(x,y)$ is an absolute difference value between the disparity $v_L(x,y)$ detected through the vertical direction matching process using the input image $V_L$ as a criterion image and the disparity $v_R(x,y)$ detected through the vertical direction matching process using the input image $V_R$ as a criterion image.

The first index value $D_1(x,y)$ can be calculated by adding the horizontal direction back matching difference value $D_u(x,y)$ to the vertical direction back matching difference value $D_v(x,y)$. The first index value $D_1(x,y)$ may be an index value indicating reliability of a disparity detected by the block matching unit 111 or the block matching unit 113 in relation to a pixel block at the position (x,y). The first index value $D_1(x,y)$ may be calculated using, for example, the following Equation (2).

$$D_1(x,y)=D_u(x,y)+D_v(x,y) \qquad (2)$$

In addition, in the embodiment, the input images $V_L$ and $V_R$ are images which respectively correspond to a left eye image and a right eye image. Therefore, the disparity generated between the input image $V_L$ and the input image $V_R$ is a disparity mainly in the horizontal direction. However, for example, in a case where a resolution is high, there are cases where a disparity in the vertical direction is generated due to a misalignment in the vertical direction of a position of an imaging device which captures a left eye image and a right eye image. Therefore, in the embodiment, the first index value $D_1(x,y)$ indicating reliability of the disparity detected through the matching process is generated by the addition of the horizontal direction back matching difference value $D_u(x,y)$ to the vertical direction back matching difference value $D_v(x,y)$. For example, in a case where a resolution is not significantly high and the vertical direction disparity $v(x,y)$ is negligible, the horizontal direction back matching difference value $D_u(x,y)$ may be used as the first index value $D_1(x,y)$ without modification.

The second index value $D_2(x,y)$ may be calculated by normalizing the correlation index value $I(x,y)$ between the input image $V_L$ and the input image $V_R$ with the activity $A(x,y)$ of the pixel block in relation to the pixel block at the position (x,y). In addition, the index value $I(x,y)$ is calculated by the block matching unit 111 or the block matching unit 113. Further, the activity $A(x,y)$ is calculated by the activity calculation unit 121 or the activity calculation unit 123. In a case of using the input image $V_L$ as a criterion, the activity $A_L(x,y)$ calculated by the activity calculation unit 121 may be used as an activity $A(x,y)$, and in a case of using the input image $V_R$ as a criterion, the activity $A_R(X,y)$ calculated by the activity calculation unit 123 may be used as an activity $A(x,y)$. In relation to the pixel block at the position (x,y), the second index value $D_2(x,y)$ may be an index value indicating reliability of the disparity detected by the block matching unit 111 or the block matching unit 113. The second index value $D_2(x,y)$ is calculated by, for example, the following Equation (3).

$$D_2(x,y) = \frac{I(x,y)}{A(x,y)} \qquad (3)$$

The third index value $D_3(x,y)$ can be calculated by multiplying the first index value $D_1(x,y)$ by the second index value $D_2(x,y)$. The third index value $D_3(x,y)$ may be an index value indicating reliability of the disparity detected by the block matching unit 111 or the block matching unit 113 in relation to the pixel block at the position (x,y). The third index value $D_3(x,y)$ can be calculated using, for example, the following Equation (4).

$$D_3(x,y)=D_1(x,y)\cdot D_2(x,y) \qquad (4)$$

Here, by referring to an example shown in the figure, the third index value $D_3(x,y)$ output as the index value D by the index value calculation unit 130 will be further described as compared with the first index value $D_1(x,y)$.

First, the first index value $D_1(x,y)$ is obtained by adding the horizontal direction back matching difference value $D_u(x,y)$ to the vertical direction back matching difference value $D_v(x,y)$. In the example shown in the figure, for example, the horizontal direction back matching difference value $D_u(x,y)$ indicates that reliability of the detected disparity is relatively low in the left side of an object (fish). In addition, in the example shown in the figure, for example, values indicating that reliability of the detected disparity is relatively higher are distributed in a part where color is closer to white. On the other hand, values indicating that reliability of the detected disparity is lower are distributed in a part where color is closer to black.

However, values are distributed in a stepwise manner from a part where the reliability is high to a part where the reliability is low in the horizontal direction back matching difference value $D_u(x,y)$. For example, in the horizontal direction back matching difference value $D_u(x,y)$, the intermediate value (hatched part) of the values is distributed in a stepwise manner between the part (white part) where values indicating that the reliability is the highest are distributed and the part (black part) where values indicating that the reliability is the lowest are distributed.

For this reason, in order to specify an occlusion region using the horizontal direction back matching difference value $D_u(x,y)$, it is problematic whether or not a value indicating what degree of reliability is set as a threshold value with regard to the detected disparity. For example, if reliability indicated by the threshold value is too low, a part where occlusion occurs in practice is not determined as an occlusion region, and a disparity which is erroneously detected is used to synthesize images as it is. On the other hand, if reliability indicated by the threshold value is too high, a part where occlusion does not occur in practice is determined as an occlusion region, and a part where a disparity is supplemented through estimation is widened more than necessary.

In contrast, values of the third index value $D_3(x,y)$ are bipolarized as the part indicating high reliability and the part indicating low reliability with regard to the detected disparity. In the example shown in the figure, the image is divided into approximately two parts, the part (the white part) where values indicating the highest reliability are distributed and the part (the black part) where values indicating the lowest reliability are distributed. Therefore, if an occlusion region is specified using the third index value $D_3(x,y)$, the setting of a threshold value is relatively easy. Thus, the occlusion determination unit 200 can determine an occlusion region more clearly. As a result, the image synthesis unit 300 can generate the output images $V_1, V_2, \ldots,$ and $V_n$ based on estimation of a parallax performed with higher accuracy.

<5. Supplement>

As above, although the preferred embodiments of the present disclosure have been described with reference to the drawings, the present disclosure is not limited to the examples. It is apparent that a person skilled in the art can conceive of a variety of modifications or alterations within the scope of the technical spirit disclosed in the appended claims, and it is understood that they are naturally included in the technical scope of the present disclosure.

For example, although, in the embodiments, the respective units of the image processing device are implemented by the DSP, the present disclosure is not limited to the example. For example, the respective units of the image processing device may be implemented by dedicated hardware, or may be implemented by software by a CPU (Central Processing Unit) executing programs stored in a storage device such as a ROM (Read Only Memory) or a hard disk, or a storage medium such as a removable disc or a flash memory.

In addition, for example, although, in the embodiments, the two matching processes and the process for calculating an activity of an image are executed by the parallel elements, this does not necessarily limit an order of the processes and circuit configurations for the processes. For example, the respective processes may be performed in parallel or sequentially. In addition, the circuit configurations for the respective processes may be appropriately designed so as to be suitable for an order of the processes.

In addition, although, in the embodiments, the image processing device has been described, the present disclosure is not limited to the example. For example, the present disclosure may be implemented as a display apparatus. In this case, the display apparatus may have functional configurations which are the same as the respective units of the image processing device described in the above-described embodiments, and further include a display unit which displays output images generated by an image synthesis unit.

The present disclosure contains subject matter related to that disclosed in Japanese Priority Patent Application JP 2011-022065 filed in the Japan Patent Office on Feb. 3, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing method comprising:
   calculating a first index value utilizing back matching between a first image and a second image in relation to a first pixel which is one or a plurality of pixels of the first image and a second pixel which is one or a plurality of pixels located at a position corresponding to the first pixel in the second image;
   calculating a second index value by normalizing a correlation index value indicating correlation between the first pixel and the second pixel using a complexity index value indicating complexity of an image which is displayed by the first pixel; and
   calculating a third index value by multiplying the first index value by the second index value.

2. The image processing method according to claim 1, wherein the first image and the second image are viewpoint images corresponding to different viewpoints, and
   wherein the third index value is an index value which indicates reliability of a parallax at a position corresponding to the first pixel among parallaxes detected through a matching process between the first image and the second image.

3. The image processing method according to claim 2, further comprising:
   determining whether or not the parallax at the position corresponding to the first pixel is reliable based on the third index value; and
   replacing the parallax at the position corresponding to the first pixel which is determined as being unreliable, with a parallax which is estimated based on a parallax at another position which is determined as being reliable among the detected parallaxes.

4. The image processing method according to claim 2, wherein the first index value is calculated by adding index values to each other which are respectively calculated through back matching in a horizontal direction and in a vertical direction between the first image and the second image.

5. The image processing method according to claim 1, wherein the second index value is calculated by dividing the correlation index value indicating correlation between the first pixel and the second pixel by the complexity index value indicating complexity of an image which is displayed by the first pixel.

6. An image processing device comprising:
   a parameter generation unit that
   calculates a first index value utilizing back matching between a first image and a second image in relation to a first pixel which is one or a plurality of pixels of the first image and a second pixel which is one or a plurality of pixels located at a position corresponding to the first pixel in the second image;

calculates a second index value by normalizing a correlation index value indicating correlation between the first pixel and the second pixel using a complexity index value indicating complexity of an image which is displayed by the first pixel; and calculates a third index value by multiplying the first index value by the second index value.

7. The image processing device according to claim 6, wherein the second index value is calculated by dividing the correlation index value indicating correlation between the first pixel and the second pixel by the complexity index value indicating complexity of an image which is displayed by the first pixel.

8. A display apparatus comprising:

a display unit; and a parameter generation unit, wherein the parameter generation unit calculates a first index value utilizing back matching between a first image and a second image in relation to a first pixel which is one or a plurality of pixels of the first image and a second pixel which is one or a plurality of pixels located at a position corresponding to the first pixel in the second image;

calculates a second index value by normalizing a correlation index value indicating correlation between the first pixel and the second pixel using a complexity index value indicating complexity of an image which is displayed by the first pixel; and calculates a third index value by multiplying the first index value by the second index value.

9. The display according to claim 8, wherein the second index value is calculated by dividing the correlation index value indicating correlation between the first pixel and the second pixel by the complexity index value indicating complexity of an image which is displayed by the first pixel.

* * * * *